(12) United States Patent
Yoshizoe

(10) Patent No.: US 6,674,507 B2
(45) Date of Patent: Jan. 6, 2004

(54) METHOD FOR MANUFACTURING FLAT TYPE DISPLAY INCLUDES FORMING CLOSED LOOP CONSISTING OF SEALANT WITH RECESS FORMED INSIDE THE LOOP

(75) Inventor: Hidefumi Yoshizoe, Izumi (JP)

(73) Assignees: NEC Corporation (JP); NEC LCD Technologies, Ltd. (JP)

( * ) Notice: Subject to any disclaimer, the term of this patent is extended or adjusted under 35 U.S.C. 154(b) by 13 days.

(21) Appl. No.: 10/156,904

(22) Filed: May 29, 2002

(65) Prior Publication Data

US 2003/0025867 A1 Feb. 6, 2003

(30) Foreign Application Priority Data

Aug. 2, 2001 (JP) ........................................ 2001-234935

(51) Int. Cl.[7] ............................................. G02F 1/1339
(52) U.S. Cl. ....................................... 349/190; 349/153
(58) Field of Search ................................. 349/153, 189, 349/190

(56) References Cited

U.S. PATENT DOCUMENTS

| 4,640,583 | A | * | 2/1987 | Hoshikawa et al. | ......... 349/153 |
| 5,893,625 | A | * | 4/1999 | Tamatani et al. | ........... 349/189 |
| 6,005,653 | A | * | 12/1999 | Matsuzawa | ................ 349/154 |
| 6,236,444 | B1 | * | 5/2001 | Konuma et al. | ............ 349/151 |

* cited by examiner

*Primary Examiner*—Tarifur R. Chowdhury
(74) *Attorney, Agent, or Firm*—Hayes Soloway P.C.

(57) ABSTRACT

A belt-shaped sealant is coated on a substrate to surround a periphery of a display region of a flat type display device. A start point and a termination point of the sealant are disposed remote from the display region such that the sealant never intrudes into the inside of the display region when the sealant is pressed between opposing substrates of the display device.

5 Claims, 4 Drawing Sheets

FIG.1 (PRIOR ART)
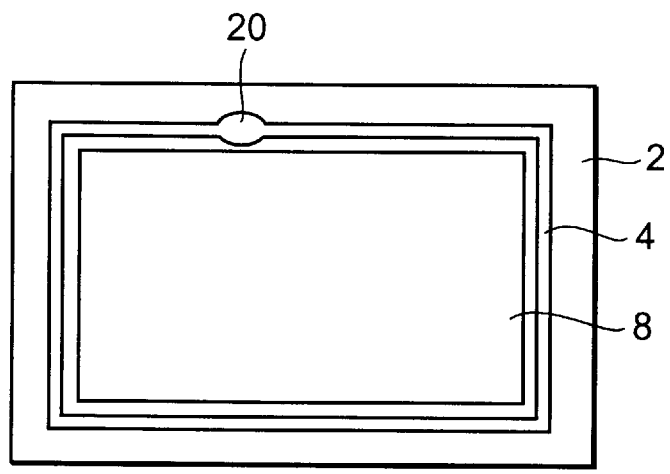
FIG.2 (PRIOR ART)
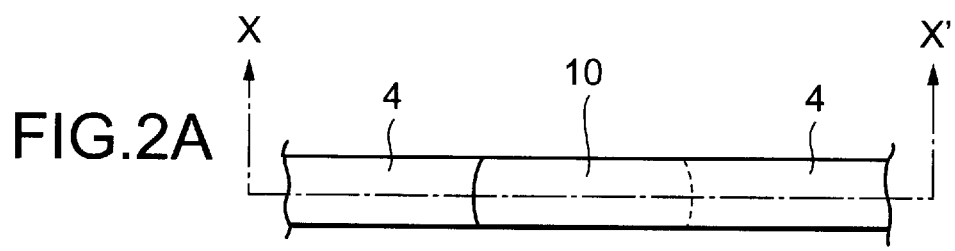
FIG.2A
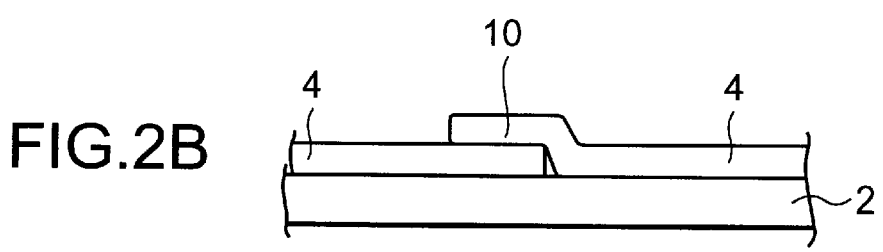
FIG.2B 
METHOD FOR MANUFACTURING FLAT TYPE DISPLAY INCLUDES FORMING CLOSED LOOP CONSISTING OF SEALANT WITH RECESS FORMED INSIDE THE LOOP

BACKGROUND OF THE INVENTION

1. Field of the Invention

The present invention relates to a method for manufacturing a flat type display device and a flat type display device manufactured by the same, and particularly to a sealant applying method, which is used for sealing a liquid crystal material within a liquid crystal panel.

2. Description of the Prior Art

Conventionally, the following methods as a method for sealing a liquid crystal within the inside of a liquid crystal panel have been known. That is, in one case, a sealant is applied to one substrate to form an closed loop thereon and the one substrate is adhered to the other substrate via the closed-loop-shaped sealant, and then, a liquid crystal material is sucked into a space between the one and other substrates via a gap formed in via the closed-loop-shaped sealant. In another case, a sealant is applied to one substrate to form an closed loop thereon and a liquid crystal material is dropped within the closed loop on the one substrate, and then, the other substrate is adhered to the one substrate having the liquid crystal material dropped thereon via the closed-loop-shaped sealant.

According to the one method in which a liquid crystal is sucked into a space between the one and other substrates, it is necessary to keep a part of the sealant open so that the part serves as an inlet through which a liquid crystal material is guided into the space between the two substrates. According to the other method in which a liquid crystal material is dropped on one substrate, as shown in a plan view of FIG. 1, a sealant 4 is coated on a substrate 2 so as to completely surround a periphery of a display region 8. Therefore, when using a nozzle to coat a sealant, the sealant 4 is coated such that one end portion of the sealant 4 overlaps the other end portion thereof at around a start point where the sealant begins traveling on the substrate and a termination point where the sealant terminates traveling on the substrate, as shown in FIGS. 2A and 2B. Note that FIG. 2A is an enlarged plan view of an overlapped portion 10 in a situation where the sealant is coated on the substrate 2 such that one end portion of the sealant overlaps the other end portion thereof and the substrate 2 and the other substrate are disposed facing each other before pressing the two substrates to adhere to each other. FIG. 2B is a sectional view of the overlapped portion 10 cut along the line X–X' of FIG. 2A.

However, as described above, when the sealant 4 is coated on the substrate 2 such that one end portion of the sealant overlaps the other end thereof and the substrate 2 and the other substrate are pressed against each other, the overlapped portion 10 becomes wider than other portion of the sealant in which the sealant is not made overlapped each other while intruding into the display region 8, as shown in FIG. 1, thereby causing various problems. To prevent the sealant, i.e., an expanded-overlapped portion 20, from intruding the display region 8, the overlapped portion 10 has to previously be formed apart a long distance from the display region 8, thereby forcing a manufacturer to keep an additional space for a sealant.

SUMMARY OF THE INVENTION

An object of this invention is to provide a method for manufacturing a flat type display device to prevent a sealant from intruding into a display region of the device and remove an undesired space from the device by reducing spacing between the sealant and the display region. Another object of this invention is to provide a flat type display device manufactured by the above-described method.

The method for manufacturing a flat type display device according to the present invention is constructed such that a sealant is coated on at least one of two opposing substrates so as to surround a display region in such a manner that a start point and a termination point of the sealant are displaced from the display region toward a periphery of the at least one of two opposing substrates, the start point and termination point being defined such that coating of the sealant begins at the start point and terminates at the termination point, and the two opposing substrates are adhered to each other to form a closed loop consisting of the sealant with a recess formed in an inner periphery of the closed loop.

The method for manufacturing a flat type display device has two application forms as follows.

First, the sealant is coated to cross over a part of the sealant before the termination point, the part being located just next to the start point.

Secondly, the start point and the termination point are apart from each other before the step for adhering the two opposing substrates to each other and the start point and the termination point of the sealant melt in each other in the step for adhering the two opposing substrates to each other.

Therefore, according to a method for manufacturing a flat type display device constructed in accordance with the present invention, when coating a sealant on a periphery of a display region of a flat type display device, the sealant is coated such that the sealant is formed traveling apart gradually from the display region toward start and termination points of the sealant while overlapping a part thereof outside the closed loop portion and therefore, even when the two substrates are adhered to each other to resultantly widen the width of the sealant, the sealant never intrudes into the display region.

BRIEF DESCRIPTION OF THE INVENTION

FIG. 1 is a plan view of a conventional liquid crystal display device to show how a sealant loop looks like when two substrates are apposed together by bonding.

FIG. 2A is an enlarged plan view of the overlapped portion of a sealant loop of the conventional liquid crystal display device before the two substrates are apposed together by bonding. FIG. 2B is a sectional view of the same overlapped portion cut along the line X–X' of FIG. 2A.

FIG. 4 puts a focus on the overlapped portion of the sealant loop formed in accordance with this invention.

DETAILED DESCRIPTION OF THE PREFERRED EMBODIMENTS

An embodiment of a method for manufacturing a flat type display device and a flat type display device manufactured through the method, both being constructed in accordance with the present invention and the flat type display device being exemplified by a liquid crystal display device, will be described below.

Figure 3:
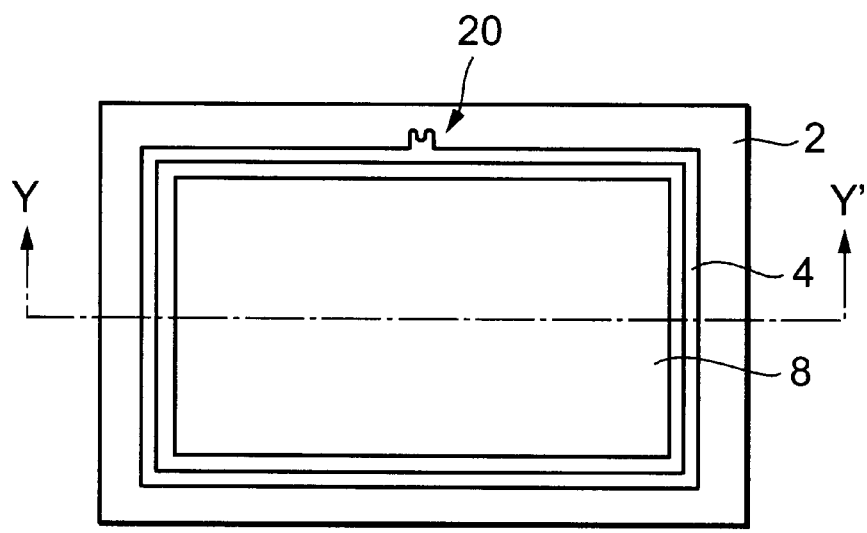
FIG. 3 is a plan view of a liquid crystal display device representing a first example of this invention to show how a sealant loop looks like when two substrates are apposed together by bonding.
Figure 4:
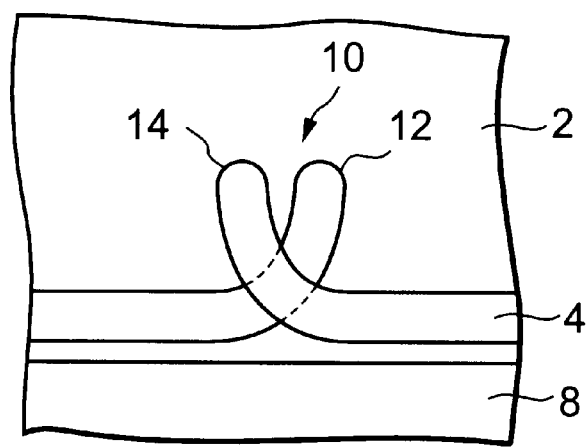
FIG. 4 is an enlarged plan view of the overlapped portion of the sealant loop of the liquid crystal display device representing the first example of this invention, before the two substrates are apposed together by bonding.
Figure 5:
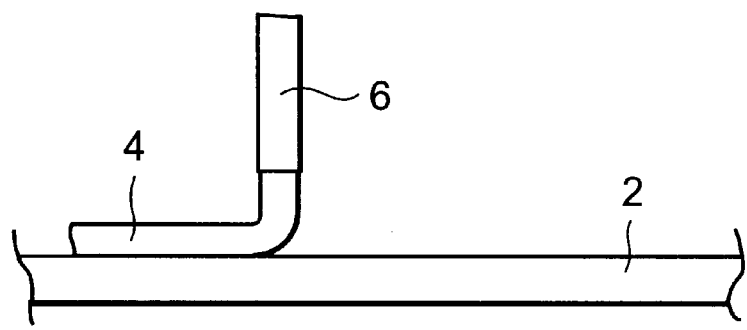
FIG. 5 is a diagram to show how a nozzle looks like when it ejects a sealant thread for application.

FIG. 3 is a plan view of a sealant 4 in a situation where one substrate having the sealant 4 coated thereon is adhered to the other substrate via the sealant 4. As can be seen in the figure, the sealant 4 is securely coated on a predetermined portion (shaped like a closed loop) of the substrate 2. The two substrates are adhered to each other in the following manner FIG. 4 is an enlarged plan view of an overlapped portion 10 of a sealant 4. As shown in FIG. 4, a portion apart from a predetermined portion (closed loop portion) on which a sealant should be coated is determined as a start point 12 and then, coating of the sealant 4 begins at the start point 12 by using a nozzle. The start point 12 is a portion on which the sealant is coated, in more detail, externally spaced a predetermined distance from the display region 8. The sealant 4 is coated starting from the start point 12 while traveling to the predetermined portion (closed loop portion) in an arc form. When the nozzle reaches the predetermined portion (closed loop portion) on which the sealant should be coated, the sealant changes its direction of travel and thereafter, is coated traveling sequentially along the predetermined portion (closed loop portion). Note that the sealant 4 is coated on the substrate 2 using a nozzle 6 shown in FIG. 5.

In this case, two coating methods can be available.

That is, the sealant 4 is coated on the substrate 2 by moving the nozzle 6 itself or contrary to it, by moving the substrate 2 with respect to the nozzle 6. The predetermined portion on which the sealant should be coated is defined as a periphery of the display region 8, i.e., a portion (closed loop portion) along an outer periphery of the region in which a liquid crystal is enclosed.

When the sealant 4 has traveled along and entirely around the predetermined portion (closed loop portion), the nozzle 6 makes the sealant 4 change its direction of travel at a position where the sealant crosses over the portion of the sealant extending from the closed loop portion toward the start point 12 and then, the sealant is coated traveling toward the termination point 14. Thereafter, when the sealant has been coated reaching a position equivalent to the start point 12 with respect to the closed loop portion, the nozzle 6 is stopped to complete the coating. The position is defined as the termination point 14.

After the sealant is coated on the substrate 2, the following process steps are carried out: disperse spacers (not shown) within the display region 8 or drop a predetermined amount of liquid crystal material on the display region 8; and dispose the two substrates so as to face each other; and then, apply a predetermined pressure at a specific temperature to adhere the two substrates to each other. As can be seen inform FIG. 3, the sealant 4 is securely coated on the predetermined portion.

Figure 6:
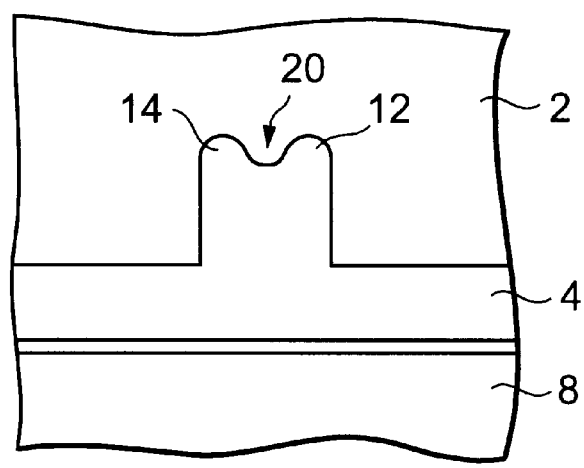
FIG. 6 is a plan view of the liquid crystal display device representing the first example of this invention to show how the sealant loop looks like when the two substrates are apposed together by bonding.

How a geometric shape of the overlapped portion 10 of the sealant 4 before the two substrates are adhered to each other looks like after the two substrates have been adhered to each other is shown in FIG. 6. As already described, the sealant 4 on the substrate before two substrates are adhered to each other is disposed on the substrate such that the sealant begins to travel from the position externally spaced from the predetermined portion (the portion surrounding the display region in a rectangular form) on which the sealant should be coated and then, travels along the predetermined portion, and thereafter, returns to around the start point 12 while being apart from the predetermined portion. In this case, although the two end portions of the sealant 4 are overlapped each other around a portion where the sealant returns to around the start point 12, the overlapped portion of the sealant is located on a position outside the display region 8 (refer to FIG. 4). Accordingly, even when the other substrate is adhered to the substrate 2 to resultantly widen the width of the overlapped portion 10 of the sealant 4 after completion of process steps such as dispersion of spacers and dropping of liquid crystal material, since the overlapped portion 10 is positioned outside the predetermined portion, the widened overlapped portion 20 never affects the display region. As described above, the method for coating a sealant according to the present invention can be summarized as follows.

That is, a method for manufacturing a display device comprises:

a step for coating at least one string of a sealant on a first substrate forming a closed loop of the sealant so that the sealant begins to travel from one end of the sealant, the one end located outside the closed loop, and then, along the closed loop until the sealant comes within a predetermined distance of the one end, and further, approaches the one end while gradually being apart from the closed loop to finally stop its travel spaced a distance shorter than a specific value from the one end;

a step for dropping a liquid crystal material inside the closed loop of the sealant on the first substrate; and a step for adhering a second substrate to the sealant on the first substrate.

A first aspect of the method for coating a sealant of the present invention is constructed such that in the above-described method for coating a sealant, the sealant travels crossing over the sealant already coated on the first substrate before the sealant finally stops its travel.

A second aspect of the method for coating a sealant of the present invention is constructed such that in the above-described method for coating a sealant, two adjacent ends of the sealant are disposed apart from each other and in the step for adhering the second substrate to the sealant on the first substrate, the two adjacent ends melt in one another and the melted portion of the sealant never intrudes into the region inside the closed loop.

Furthermore, as shown in FIG. 4, the sealant is coated drawing an arc toward the start point 12 and the termination point 14, respectively, and the overlapped portion of the sealant is positioned outside the predetermined portion (closed loop portion). Accordingly, even when the overlapped portion 10 of the sealant 4 of FIG. 4 is pressed to resultantly widen the width of the overlapped portion, the sealant 4 never intrudes into the display region 8. Note that the arc of the sealant 4 and the position of the overlapped portion are appropriately adjusted not to make the sealant intrude into the display region depending on the degree of spread of the sealant 4 observed when the sealant is pressed.

Figure 7:
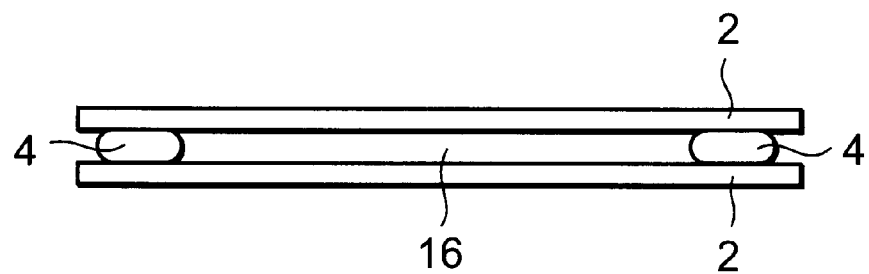
FIG. 7 is a sectional view of the liquid crystal display device of the first example cut along the line Y–Y' of FIG. 3.

The liquid crystal display device formed as described above presents a cross sectional view thereof as shown in FIG. 7. Note that FIG. 7 is a cross sectional view taken along a line Y–Y' of FIG. 3. As shown in FIG. 7, the sealant 4 is provided between the two substrate having such components as an electrode and a color filter therein and a liquid crystal material 16 is enclosed within a closed space sealed by the sealant and the two substrates, and then, a polarizer (not shown) or the like is provided on the associated portion, and finally, electrodes (not shown) on the two substrates are supplied with electricity to display images.

Figure 8:
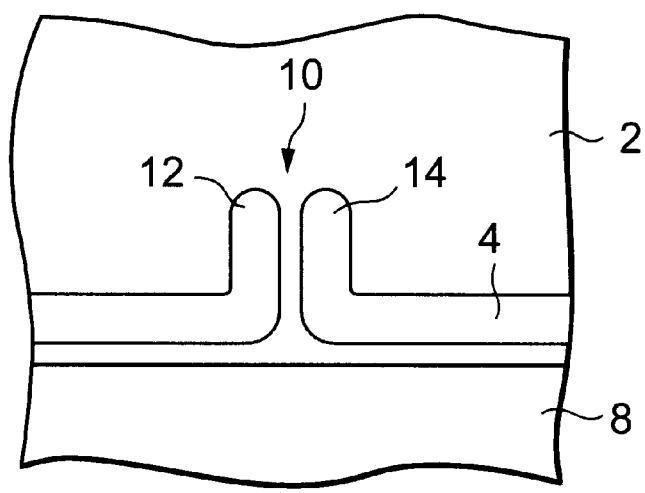
FIG. 8 is an enlarged plan view of closely apposed both ends of a sealant loop of a liquid crystal display device representing a second example of this invention, before two substrates are apposed together by bonding.

A method for coating a sealant of another embodiment of the present invention is shown in FIG. 8. Although the sealant 4 of FIG. 4 is formed to make one end portion thereof cross over the other end portion thereof outside the closed loop portion, the sealant of this embodiment is formed such that two end portions of the sealant are apart from each other as shown in FIG. 8. Also in the embodiment, the two end portions of the sealant 4 melt in one another after curing of the sealant to enclose the periphery of the display region 8 by the sealant.

It will be appreciated that although the embodiments are described to form only one liquid crystal display device on the substrate 2, the embodiments can be applied to a case where a plurality of liquid crystal display devices are formed on the substrate 2. Furthermore, the closed loop portion of the sealant 4 of the embodiments is not necessarily required to present a rectangular geometric shape. In addition, the position of the overlapped portion 10 is not necessarily required to be located in the center of a side of the closed loop portion of the sealant 4 and may be located at other positions such as a corner of the closed loop portion. Moreover, needless to say that the present invention is not limited to the liquid crystal display device described in the embodiments and may be applied to other display devices that are formed by adhering two substrates to each other.

As described so far, according to a method for manufacturing a flat type display device and a flat type display device manufactured by the method, both being constructed in accordance with the present invention, when coating a sealant on periphery of a display region of a flat type display device, the sealant is coated such that the sealant is formed traveling apart gradually from the display region toward start and termination points of the sealant and therefore, even when the two substrates are adhered to each other to resultantly widen the width of the sealant, the sealant never intrudes into the display region.

What is claimed is:

1. A method for manufacturing a flat type display device comprising the steps of:

coating a sealant on at least one of two opposing substrates so as to surround a display region in such a manner that a start point and a termination point of said sealant are displaced from said display region toward a periphery of said at least one of two opposing substrates, said start point and termination point being defined such that coating of said sealant begins at said start point and terminates at said termination point; and adhering said two opposing substrates to each other to form a closed loop consisting of said sealant with a recess formed in an inner periphery of said closed loop.

2. The method for manufacturing a flat type display device according to claim 1, wherein said start point and said termination point are apart from each other before said step for adhering said two opposing substrates to each other and said start point and said termination point of said sealant melt in each other in said step for adhering said two opposing substrates to each other.

3. The method for manufacturing a flat type display device according to claim 1, wherein said sealant is coated so as to form a cross-over portion adjacent to said termination point and said start point.

4. The flat type display device manufactured by using the method for manufacturing a flat type display device of claim 1.

5. A method for manufacturing a flat type display device comprising the steps of:

coating a sealant having a constant width on at least one of two opposing substrates so as to dispose said sealant on a portion of said at least one of two opposing substrates apart a predetermined distance from a periphery of said at least one of two opposing substrates; and adhering said two opposing substrates to each other to form a closed loop consisting of said sealant, said method being further constructed such that a start point and a termination point of said sealant are displaced from said closed loop toward a periphery of said at least one of two opposing substrates so as not to form a projection intruding into an inner periphery of said closed loop, said start point and termination point being defined such that coating of said sealant begins at said start point and terminates at said termination point.

* * * * *